US00RE42084E

(19) United States
(12) Reissued Patent
Bäcklund

(10) Patent Number: US RE42,084 E
(45) Date of Reissued Patent: Feb. 1, 2011

(54) DIAPHRAGM VALVE

(75) Inventor: Ingvar Bäcklund, Lindingö (SE)

(73) Assignee: Buerkert Werke GmbH, Ingelfingen (DE)

(21) Appl. No.: 11/783,878

(22) PCT Filed: Nov. 8, 1996

(86) PCT No.: PCT/SE96/01441

§ 371 (c)(1),
(2), (4) Date: May 6, 1998

(87) PCT Pub. No.: WO97/17558

PCT Pub. Date: May 15, 1997

Related U.S. Patent Documents

Reissue of:
(64) Patent No.: 5,971,025
Issued: Oct. 26, 1999
Appl. No.: 09/068,585
Filed: May 6, 1998

(30) Foreign Application Priority Data

Nov. 10, 1995 (SE) ..... 9503995

(51) Int. Cl.
*F16K 7/12* (2006.01)

(52) U.S. Cl. ..... 137/883; 251/331

(58) Field of Classification Search ..... 137/883; 251/331
See application file for complete search history.

(56) References Cited

U.S. PATENT DOCUMENTS 5,469,886 A * 11/1995 Noya ..... 137/599.04
5,549,134 A * 8/1996 Browne et al. ..... 251/331
5,657,786 A * 8/1997 DuRoss et al. ..... 251/331

FOREIGN PATENT DOCUMENTS

EP 0618389 A1 * 3/1994
WO WO 95/00782 * 1/1995

* cited by examiner

*Primary Examiner*—John Fox
(74) *Attorney, Agent, or Firm*—Birch, Stewart, Kolasch & Birch, LLP

(57) ABSTRACT

A valve housing of a diaphragm valve has a first valve chamber, into which open a central channel and first and second channels. Valve seats are arranged in the housing, and a first diaphragm is adapted to seal against at least one of the first and second valve seats. A second valve chamber, into which opens a fourth channel, communicates with the central channel through an opening in the housing. A third valve seat is provided and a second diaphragm is adapted to seal the third valve seat.

5 Claims, 4 Drawing Sheets

DIAPHRAGM VALVE

Matter enclosed in heavy brackets [ ] appears in the original patent but forms no part of this reissue specification; matter printed in italics indicates the additions made by reissue.

This application claims the benefit under 35 U.S.C. §371 of prior PCT International Application No. PCT/SE96/01441, which has an International filing date of Nov. 8, 1996, which designated the United States of America, the entire contents of which are hereby incorporated by references.

BACKGROUND OF THE INVENTION

1. Field of the Invention

The present invention concerns a development of the three-way diaphragm valve described in WO 95/00782.

2. Description of the Background Art

That diaphragm valve is intended for controlling a flow of gaseous or liquid fluid and includes a valve housing having a valve chamber. Into the valve chamber opens a central channel and on each side thereof a first side channel and a second side channel, respectively. Valve seat means is arranged in the housing and an elastic diaphragm is adapted to be brought into and away from sealing contact with at least one of the valve seat means by means of control means for actuating the diaphragm. At least one portion of each valve seat means is common to the central channel and one of the side channels. Two control means are arranged to press the diaphragm against one such portion each, thereby to shut passage of fluid between the central channel and the respective side channel. The two control means also raise one portion each of the diaphragm off the respective portion of the valve seat means thereby to open passage of flow between the control channel and the respective side channel.

SUMMARY OF THE INVENTION

This prior art diaphragm valve has proven to operate extremely well. There is, however, a desire to convert it to a four-way valve, i.e., a valve for mixing three flows, or, to direct one flow to one or more of three different outlets. In achieving this, the new diaphragm valve shall comply with the same extensive sanitary requirements as the prior one, it shall be simply and reliably operable and have relatively few movable parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BRIEF DESCRIPTION OF THE PREFERRED EMBODIMENTS

The four-way diaphragm valve according to the present invention includes three main parts: a valve housing 11, an upper operating unit 12 and a lower operating unit 13.

As initially stated, the valve according to the present invention constitutes a development of the three-way diaphragm valve described in WO 95/00782. That valve includes a valve housing and an operating unit capable of controlling movements of a diaphragm so as to bring the diaphragm into and away from sealing contact with valve seats provided in an upper surface of the valve housing around mouths of three channels provided in the valve housing and having each an outer port. The prior art valve corresponds in all essential to the upper part of the valve according to the present invention, i.e., the upper operating unit 12 and an upper portion of the valve housing 11 and will now be described more in detail.

Figure 6:
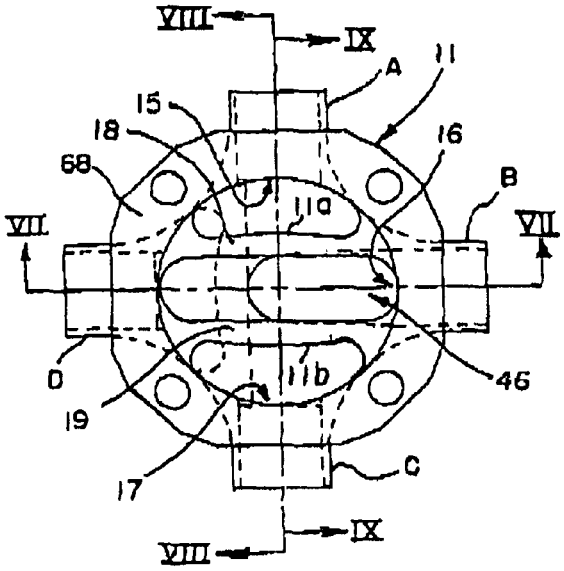
FIG. 6 is a top view of the valve housing.
Figure 7:
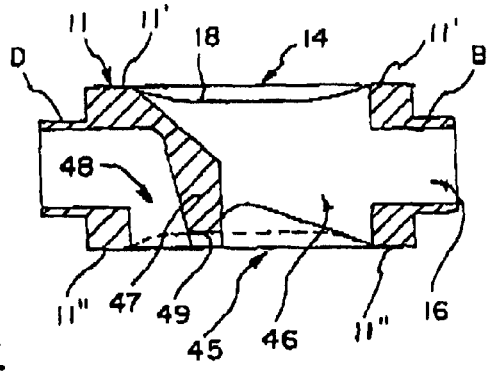
FIG. 7 is a section taken along line VII—VII in FIG. 6.
Figure 8:
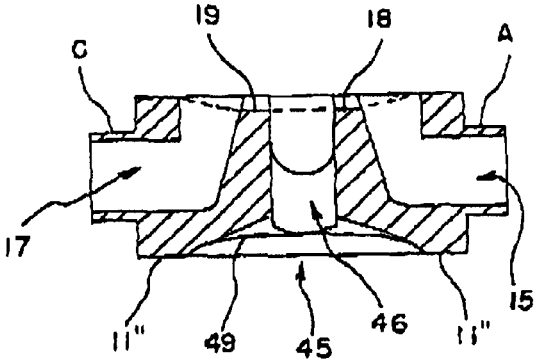
FIG. 8 is a section taken along line VIII—VIII in FIG. 6.
Figure 9:
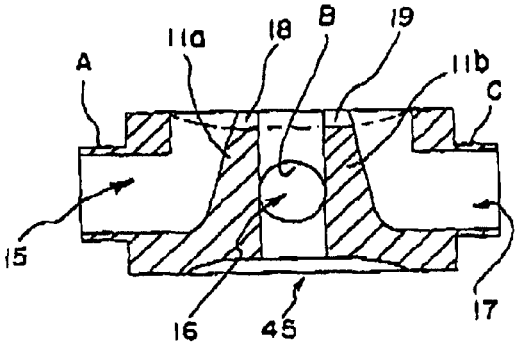
FIG. 9 is a section taken along line IX—IX in FIG. 6.

The valve housing 11 has an upwardly turned, substantially circular valve chamber 14 (FIGS. 6–9), in which open a first side channel 15, a central channel 16 and a second side channel 17, having each an outer fluid connection or port A, B and C, respectively. The channels 15 and 17 are substantially symmetrically arranged with respect to the central channel 16. The mouths of the channels 15 and 16, and 16 and 17, respectively, are separated by valve housing walls 11a and 11b, respectively, that are symmetrically located with respect to the central channel 16. Portions of the surface of the valve housing around the mouths of the channels form valve seats 18 and 19, respectively (FIGS. 6, 8, 9).

Figure 4:
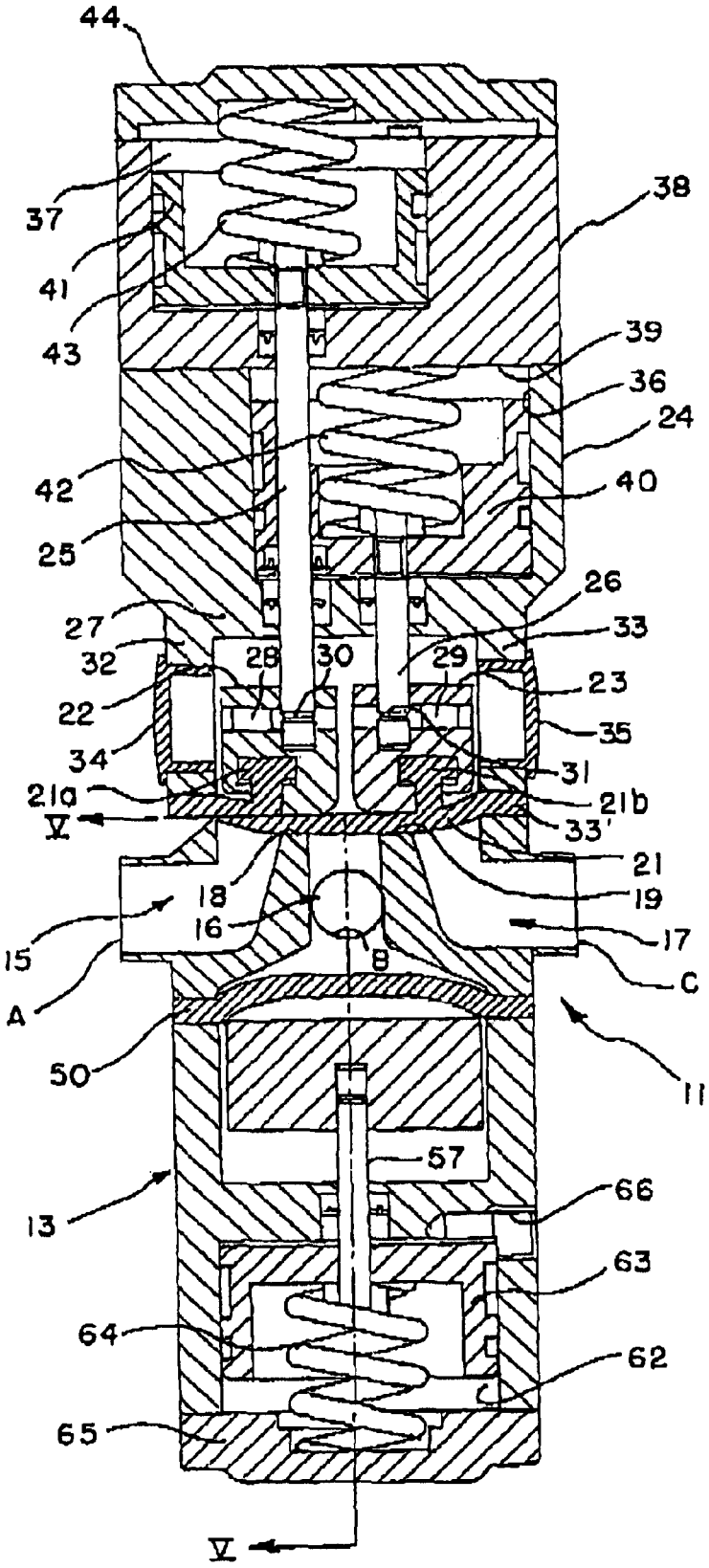
FIG. 4 is a vertical central section taken along line IV—IV in FIG. 3, but at a larger scale.

A resilient diaphragm 21 (FIG. 4) is arranged on the valve housing 11 and is adapted to be brought into and away from sealing contact with at least one of the valve seats.

In order to control the movements of the diaphragm 21, the valve is provided with the upper operating unit 12, in turn comprising control means acting on the diaphragm and drive means for selectively moving the control means.

The control means includes two pressure and lifting blocks 22 and 23, which are guided for upward and downward movement within the lower portion of a housing 24 forming a part of the upper operating unit. The blocks are adapted to press one portion each of the diaphragm 21 against the valve housing and its respective seatings and to lift corresponding portions off the valve housing. For the latter purpose, the diaphragm 21 is provided with two separated yokes 21a, 21b, having substantially T-shaped cross-sections and being located symmetrically about a vertical plane of symmetry including the center line of the diaphragm and the axis of the central channel 16. In a respective lower surface the blocks 22 and 23 have inverted T-shaped recesses accommodating a respective one of the yokes 21a, 21b. In the blocks are attached the lower ends of pull and push rods 25 and 26, respectively, that are sealingly guided in a wall 27 of the housing 24.

The rods 25 and 26 are coupled to the blocks 22, 23 by means of threaded conical pins 28, 29, that are screwed into threaded holes in the blocks and have their tips engaging notches 30, 31 in the rods. Mounting of the pins takes place through openings in side walls 32, 33 of the housing 24 closed by covers 34, 35.

The drive means for selectively moving the blocks 22, 23 includes a first cylinder 36 formed in the housing 24 and a second cylinder 37 formed in a housing 38 placed on top of the housing 24 and closing with its bottom wall 39 the cylinder 36.

Pistons 40 and 41 are guided in the cylinders 36 and 37 and are fixedly connected to the upper ends of the rods 25 and 26, respectively.

As more closely explained and described in WO 95/00782, the rod 25 sealingly extends through the cylinder 36 and its associated piston 40.

A respective spring 42, 43 is placed between the piston 40 and the bottom wall 39 of the housing 38 as well as between the piston 41 and a cover 44 closing the cylinder 37 so as to urge the respective piston and its associated rod 25, 26 and block 22, 23 in a downward direction.

Figure 1:
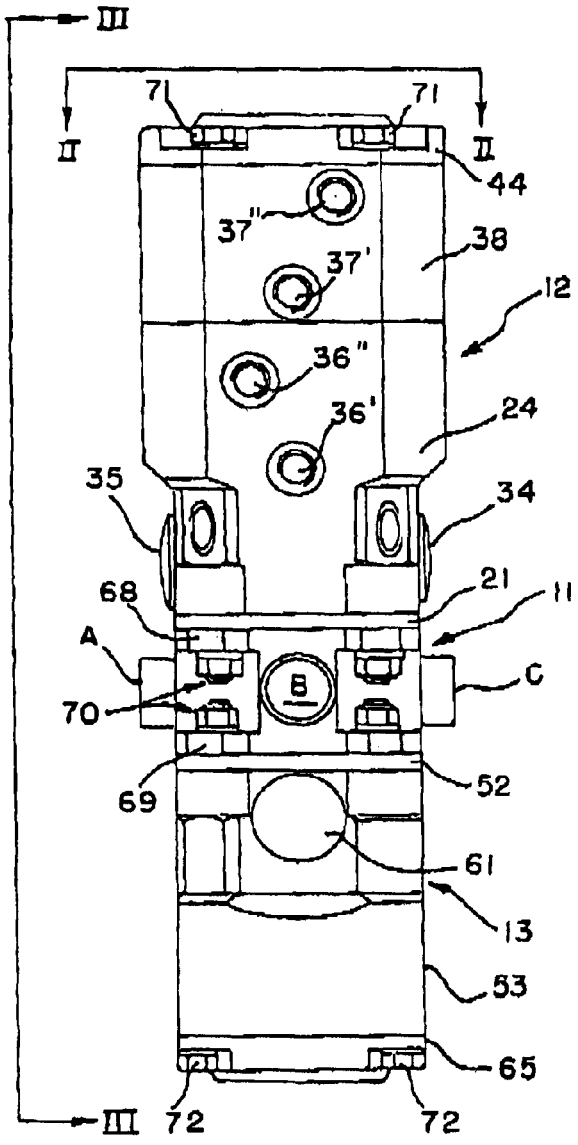
FIG. 1 is a first side-view of a valve according to the present invention.

The diaphragm 21 is sealingly clamped between an outer rim 11' of the valve housing 11 and corresponding bottom rims 32', 33' of the walls 32, 33. As is shown in the sectional view of FIG. 4, the blocks 22, 23 press a respective portion of the diaphragm 21 sealingly against the seals 18, 19. Selective introduction of a pressurized fluid (generally air) through an inlet 36', 37' (FIG. 1) into a respective cylinder 36, 37 under the associated piston 40, 41 will cause either or both blocks to raise, thereby lifting a respective portion of the diaphragm off the seats 18, 19 against the action of the springs. Raising of block 22 only will cause fluid communication between channels 15 and 16 (ports A and B), raising of block 23 only will cause fluid communication between channels 16 and 17 (channels B and C), and raising of both blocks 22 and 23 will cause fluid communication between all three channels 15, 16 and 17 (ports A, B and C). Air on the upper side of the pistons is relieved through openings 36", 37", respectively (FIG. 1).

As far as the valve has been now described it corresponds in all essential to a valve according to the second embodiment of the three-way valve described in WO 95/00782. In such a valve, the central channel 16 is the channel through which a medium is introduced into the valve to be selectively distributed to either or both of the side channels 15, 17, or, oppositely, the central channel 16 is the channel that selectively can receive a medium from either or both of the channels 15, 16.

According to the present invention, the prior art valve has been completed with a fourth port D that may be selectively put into communication with the port B.

This has been accomplished by forming a second valve chamber 45 in the lower surface of the valve housing 11. This valve chamber, in the embodiment shown also substantially circular, communicates through an opening 46 in the valve body with the channel 16. The port D communicates through a channel 48 with the valve chamber 45. The channel 48 is substantially aligned with the central channel 16, i.e., it is also a central channel in relation to the side channels 15 and 17. A valve housing wall 47 divides the valve chamber in two parts, one communicating with the channel 48 and one with the opening 46. A surface of the valve housing wall forms a valve seat 49, substantially corresponding to one of the valve seats 18, 19. The valve seat 49 extends in a direction substantially perpendicular to the direction of the valve seats 18, 19 and, for a reason that will be explained hereinbelow, preferably excentrically over the valve chamber 45. This excentricity preferably corresponds to the excentricity of any one of the valve seats 18, 19.

A second diaphragm 50 is clamped between a lower rim 11" of the valve housing 11 and corresponding top rims 51', 52" of side walls 51, 52 of a housing 53 forming a part of the lower operating unit 13. Like the upper operating unit 12, the lower operating unit comprises control means acting on the second diaphragm 50 and drive means for moving the control means.

This control means includes a pressure and lifting block 54 guided for upward and downward movement within the walls 51, 52 of the housing 53. This block is adapted to press, with a nose portion 54', a portion of the diaphragm 50 against the valve seat 49 (see FIG. 7) and to lift that portion off the valve seat. For the latter purpose, the diaphragm 50 is provided with a yoke 55 having substantially T-shaped cross-section and being excentrically located in correspondence to the excentric location of the valve seat 49.

In an upper surface the block 54 has an inverted T-shaped recess 56 for receiving the yoke 55. In the block 54 is attached the upper end of a pull and push rod 57, that is sealingly guided in a wall 58 of the housing 53.

The rod 57 is coupled to the block 54 by means of a threaded conical pin 59, that is screwed into a threaded hole in the block and has its tip engaging a notch 60 in the rod. Mounting of the pin takes place through an opening in a side wall of the housing 53 closed by a cover 61.

The drive means for moving the block 54 includes a cylinder 62 formed in the housing 53. A piston 63 is guided in the cylinder 62 and is fixedly connected to the lower end of the rod 57. A spring 64 is placed between the piston 63 and a cover 65 closing the cylinder 62 so as to urge the piston and its associated rod 57 and block 54 in an upward direction.

Figure 3:
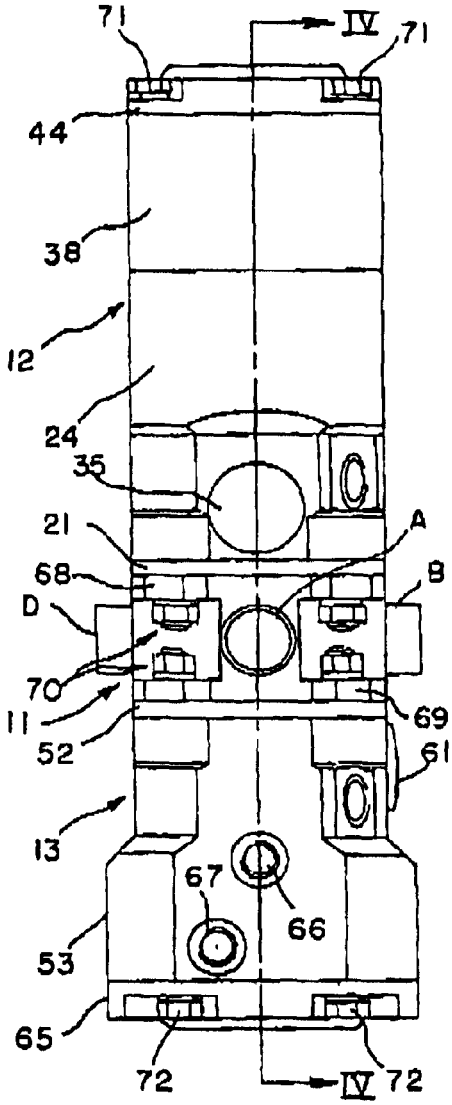
FIG. 3 is a second side-view of the valve according to FIG. 1 seen in the direction III—III indicated in FIG. 1.

Introduction of a pressurized fluid (generally air) through an inlet 66 (FIGS. 3 and 4) into the cylinder 62 will cause the piston 63 to move downwards against the force of the spring 64, thereby lowering the portion of the diaphragm 50 sealing against the valve seat 49 from that seat and allowing flow from the channel 48 (port D) through the opening 46 to the channel 16 (port B) or vice versa. Consequently, port B may be connected to either of ports A, C and D, simultaneously to ports A+C, A+D, or C+D, or, simultaneously to ports A+C+D. Air on the lower side of the piston 63 is relieved through an opening 67 (FIG. 3).

Figure 5:
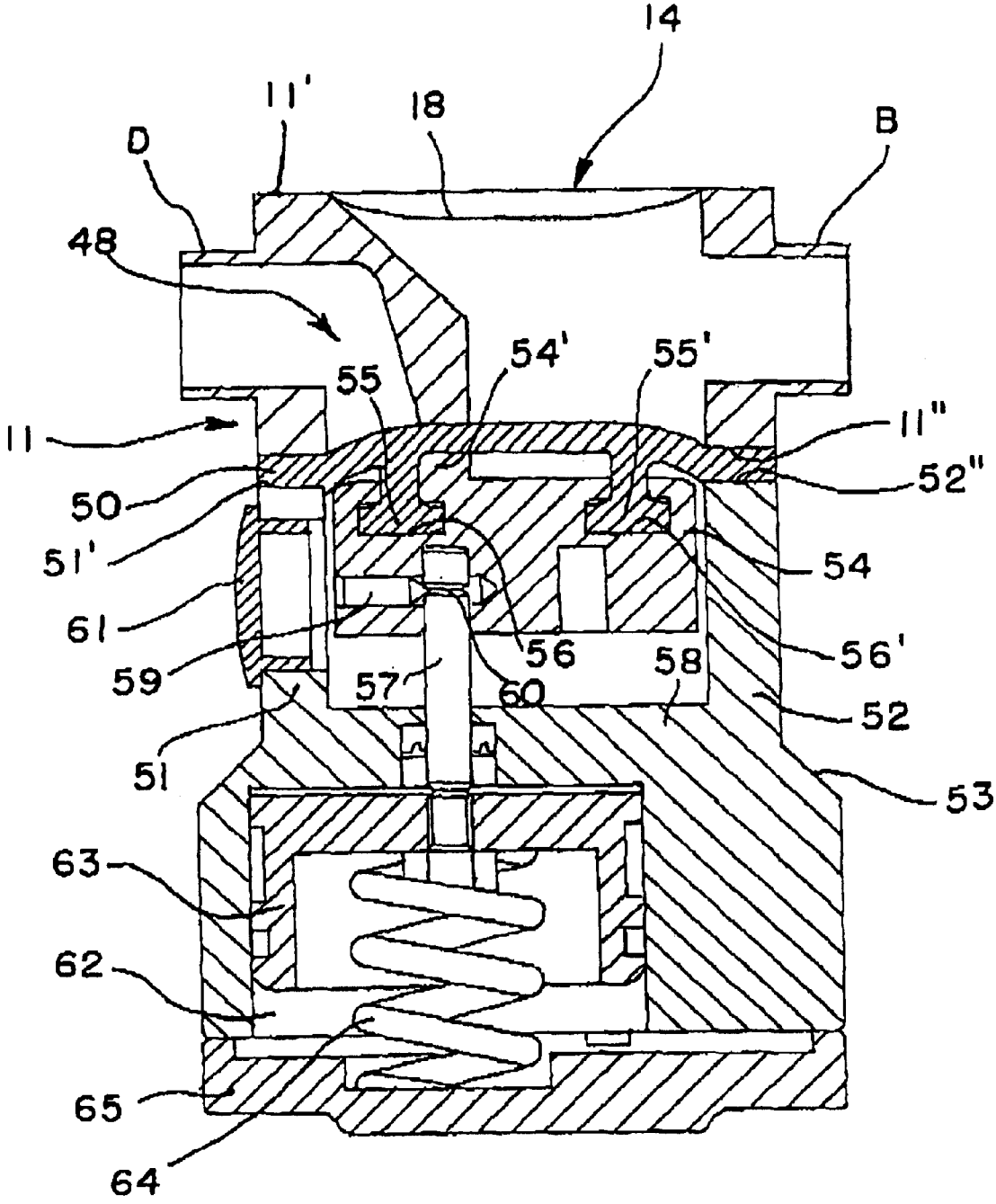
FIG. 5 is a section through the valve housing and the lower operating unit taken along line V—V in FIG. 4.

In order to provide a uniform lowering of the diaphragm 50, it may be provided with a second yoke 55' engaged in a second recess 56' in the block 54, as shown in FIG. 5. This diaphragm having two yokes is preferably identical to the diaphragm 21, and this is the reason why it is preferred to have the valve seat 49 eccentrically located in the valve chamber 45.

It is further preferred to make the blocks 22, 23 and 54 from one and the same blank in the shaped of a cylindrical bar. The bar is cut and every cut piece is shaped to either one block 54 or two blocks 22 and 23.

It is obvious to the person skilled in the art that the springs 42, 43, 64 may be replaced by other means forcing the pistons in a direction pressing the diaphragms against the respective valve seats. Particularly when it comes to larger valves, such means advantageously comprise utilization of pressurized air.

Figure 2:
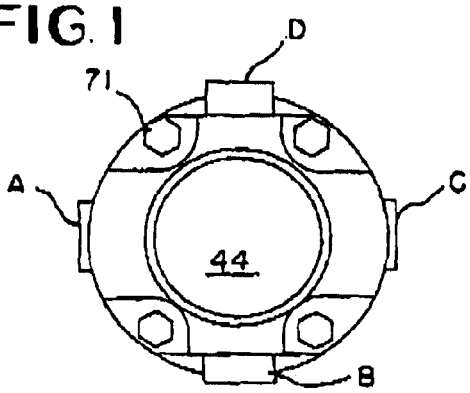
FIG. 2 is a top view in the direction II—II indicated in FIG. 1.
Figure 10:
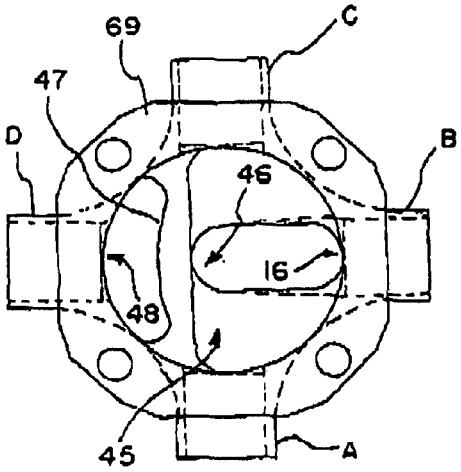
FIG. 10 is a bottom view of the valve housing.

From FIGS. 1 and 2 as well as FIGS. 6 and 10 it appears that the valve housing 11 has upper and lower flanges 68, 69, respectively. These flanges are used to clamp the upper and lower operating unit, respectively, to the valve housing 11 by means of bolts and nuts 70.

In FIGS. 1, 2 and 3 are also shown bolt heads 71, 72 for securing the covers 44, 65 to the housings 38 and 53, respectively.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A four-way diaphragm valve for controlling flow of a gas or liquid comprising:

a valve housing having a first substantially circular valve chamber and a second substantially circular valve chamber;

first, second, and third channels opening into said first substantially circular valve chamber, said second and third channels being separated from said first channel by a respective one of a first and a second substantially parallel valve seat means extending across said first substantially circular valve chamber, each valve seat means providing a substantially linear valve seat for a first elastic diaphragm, said first elastic diaphragm being adapted to be moved into and out of sealing engagement with one of said first and second valve seat means;

first and second individually operable control means, each operable control means being adapted to press a respective linear portion of said first elastic diaphragm against a respective valve seat means to thereby shut passage of fluid between said first channel and at least one of said second and third channels, each operable control means being adapted to positively raise a respective portion of said first elastic diaphragm off of a respective one of said first and second valve seat means to open fluid flow between said first channel and at least one of said second and third channels;

a fourth channel opening into said second substantially circular valve chamber, said fourth channel communicating with said first channel through an opening in said valve housing, said fourth channel being separated from said first channel by a third valve seat means extending across said second substantially circular valve [member] *chamber*, said third valve seat means providing a valve seat for a second elastic diaphragm, said second elastic diaphragm being adapted to be moved into and out of sealing engagement with said third valve seat means; and third control means being adapted to press a respective linear portion of said second elastic [diaphragm age] *diaphragm against said third valve seat means, thereby to shut passage* of fluid between said first channel and said fourth channel, said third control means being adapted to positively raise a respective portion of said second elastic diaphragm off of said third valve seat means to open fluid flow between said first channel and said fourth channel.

2. The four-way diaphragm valve of claim 1, wherein said first valve chamber is disposed on one side of said valve housing and said second valve chamber is disposed on an opposite side of said valve housing.

3. The four-way diaphragm valve of claim 1, wherein said fourth channel is substantially aligned with said first channel.

4. The four-way diaphragm valve of claims 1, 2, or 3, wherein said third valve seat means extends substantially perpendicularly to a common direction of said first and second valve seat means.

5. The four-way diaphragm valve of claims 1 or 2, wherein said third valve seat means is disposed eccentrically within said valve, said first and second valve seat means are symmetrically arranged with respect to a vertical plane of symmetry through said valve, the vertical plane including said first channel, said first and second control means are symmetrically arranged about a central portion of said first elastic diaphragm in order to be operatively linked with said first elastic diaphragm over a respective one of said first and second valve seat means, said third control means is adapted to be operatively linked with said second elastic diaphragm over said third valve seat means.

* * * * *